United States Patent
Damaraju et al.

(10) Patent No.: US 7,457,917 B2
(45) Date of Patent: Nov. 25, 2008

(54) REDUCING POWER CONSUMPTION IN A SEQUENTIAL CACHE

(75) Inventors: Satish Damaraju, El Dorado Hills, CA (US); Subramaniam Maiyuran, Gold River, CA (US); Peter Smith, Folsom, CA (US); Navin Monteiro, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 11/027,413

(22) Filed: Dec. 29, 2004

(65) Prior Publication Data

US 2006/0143382 A1    Jun. 29, 2006

(51) Int. Cl.
*G06F 12/00* (2006.01)
*G06F 13/00* (2006.01)
*G06F 13/28* (2006.01)
*G06F 1/00* (2006.01)

(52) U.S. Cl. .................. 711/118; 711/128; 713/300; 713/324

(58) Field of Classification Search .................. 713/320
See application file for complete search history.

(56) References Cited

U.S. PATENT DOCUMENTS 6,018,786 A * 1/2000 Krick et al. .................. 711/4
6,021,461 A * 2/2000 Dhong et al. ................ 711/105
6,535,959 B1 * 3/2003 Ramprasad et al. ......... 711/125
6,578,138 B1   6/2003 Kyler et al. .................. 712/241
2002/0129201 A1 9/2002 Maiyuran et al. ........... 711/113

OTHER PUBLICATIONS

Koopman, Phillip, Main Memory Architecture, Oct. 1998, Carnegie Mellon, pp. 3,6.*
Rosner, R., A. Mendelson and R. Ronen. *Filtering Techniques to Improve Trace-Cache Efficiency*. Sept. 2001. pp. 1-12. (http://www.intel.com/research/mrl/Library/trace_filtering.pdf).

* cited by examiner

*Primary Examiner*—Hyung Sough
*Assistant Examiner*—Gary W Cygiel
(74) *Attorney, Agent, or Firm*—Trop, Pruner & Hu, P.C.

(57) ABSTRACT

In one embodiment, the present invention includes a cache memory, which may be a sequential cache, having multiple banks. Each of the banks includes a data array, a decoder coupled to the data array to select a set of the data array, and a sense amplifier. Only a bank to be accessed may be powered, and in some embodiments early way information may be used to maintain remaining banks in a power reduced state. In some embodiments, clock gating may be used to maintain various components of the cache memory in a power reduced state. Other embodiments are described and claimed.

14 Claims, 5 Drawing Sheets

REDUCING POWER CONSUMPTION IN A SEQUENTIAL CACHE

BACKGROUND

The present invention relates generally to memory devices, and more particularly to cache memories.

A cache memory is a random access memory that buffers data from a main memory. A cache memory is typically employed to provide high bandwidth memory accessing to a processor. Power is becoming a critical component in modern microprocessor design because of battery life. An increasing portion of a processor's real estate is dedicated to large caches, thereby increasing cache capacity. However, leakage currents in large data arrays increase power consumption and push power envelopes.

Certain caches are referred to as sequential caches, as data within the cache is sequentially stored and accessed in a predetermined manner. For example, a first portion of data is stored in a first set of the cache, the next data portion is stored in the next set of the cache, and so forth. Types of sequential caches include an instruction cache and a trace cache, which is used to store and deliver instruction traces to a microprocessor. Instruction traces include decoded microoperations or μops, thus improving bandwidth and latency to a processor execution stage.

An instruction trace is stored in the order in which it is executed, rather than in a static order defined by a program. These traces include a head, body, and tail. A traceline includes one or more (depending on line-ending conditions) sequentially executed μops and a trace is formed from one or more tracelines in sequential sets. Trace-ending conditions may include calls, returns, backwards branches, and the like. A trace is originally fetched and decoded during a "build-mode". Subsequent accesses to the trace are referred to as "stream-mode".

Storing an instruction trace in a decoded format in a trace cache can reduce power consumption, as decoding power is only used while building the trace. However, power consumption still occurs during operation of the trace cache or other sequential cache.

A need thus exists for improved caching mechanisms and reducing power consumption within a cache.

DETAILED DESCRIPTION

As sequential caches are organized and built in a structural and deterministic manner, set and way information may be known ahead of time. In various embodiments, certain characteristics of a sequential cache may be used to significantly reduce the amount of power consumed by the cache. These characteristics include the following features of a trace cache. A trace cache hit occurs when a next linear instruction pointer (NLIP) in a pop sequence is first mapped to its appropriate trace cache set, and is then tag matched to a tag field of the head entry. Each traceline may include or be associated with a next way field, which is a pointer to the next traceline (i.e., a pointer to a way in set x+1 in which the next traceline is stored). The body of a trace minimizes any lookup penalty, as the next set and way do not require a set mapping or tag match. In some embodiments, a traceline may include or be associated with a head bit and a tail bit to identify whether it is a head or tail of the trace. Also a traceline may include or be associated with a previous field that serves to ensure that the traceline is still part of the trace being streamed out.

Thus in sequential caches, an identification of a next set may be obtained by adding a '1' to, or incrementing the current set. Therefore this next set information is known early. Similarly, way information for a next entry (i.e., a body entry) may be stored in a current entry during build mode and may also be available ahead of time. In contrast, non-sequential caches do not have such a predetermined or fixed pattern. Thus in various embodiments, early way information can be used to turn on only the cache portion that has the data of interest, saving power. In such manner, data array power savings may be provided for a sequential cache, and the deterministic nature of a sequential cache may be used to reduce power consumption.

In some embodiments, the tag field of a sequential cache may be read out only during head accesses and not during body accesses. This is because the tag field remains the same for both head and body accesses. In addition, there is no need to perform tag matching for body accesses as the next way information is stored and readily available. Similarly, a second body's next way information is stored in the first body, and so forth. Thus, the tag array may be totally shut down during body accesses. In such manner, tag array power savings may be provided for a sequential cache in accordance with an embodiment of the present invention.

In some embodiments, set addresses within a trace may be determined via an incrementer, as only the lower bits of a set address change in accessing a next entry. This characteristic may be used to reduce wordline toggling in a cache. In such manner, wordline power savings for a sequential cache in accordance with an embodiment may be provided.

Figure 1:
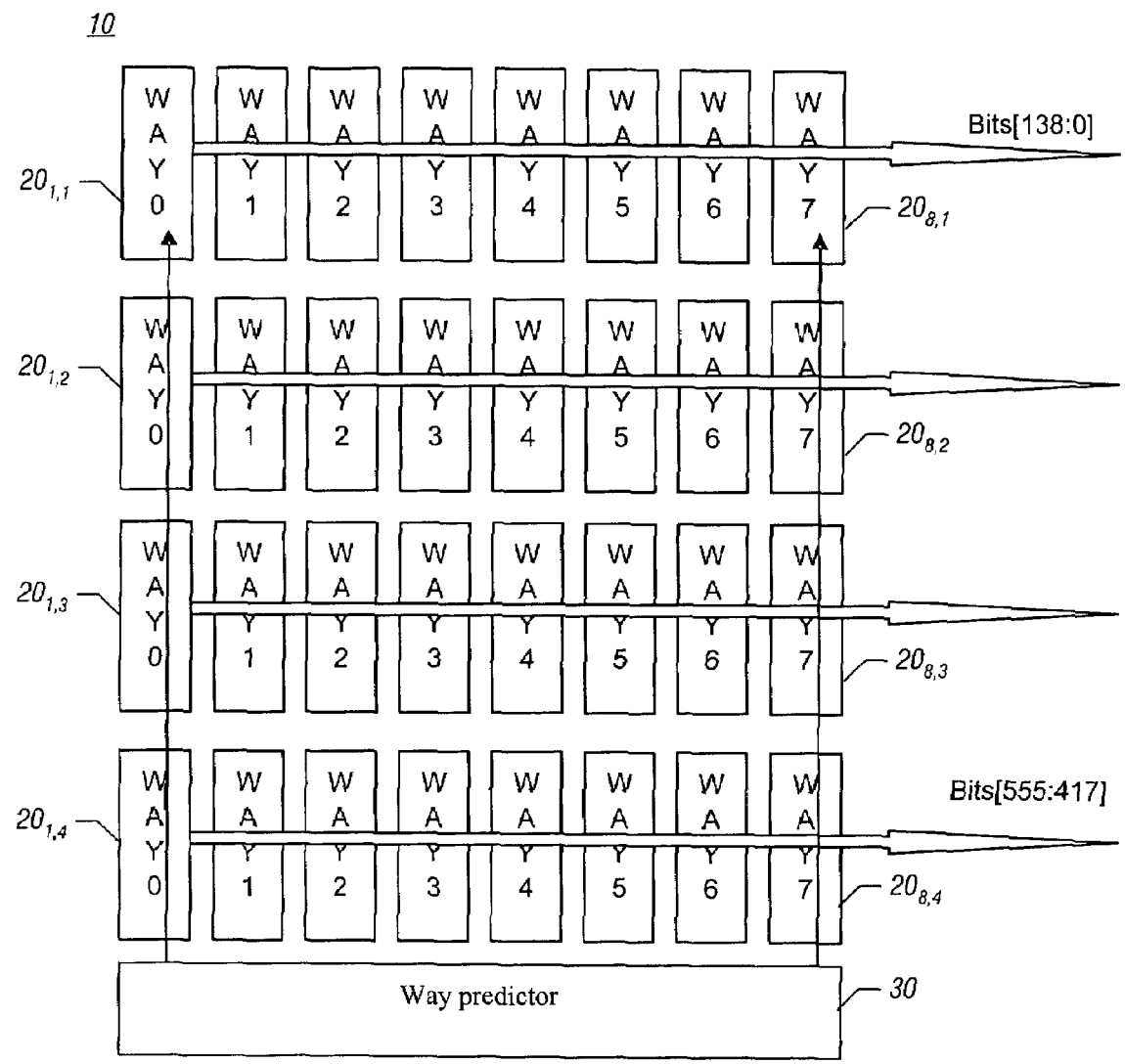
FIG. 1 is a block diagram of a cache memory in accordance with one embodiment of the present invention.

Referring now to FIG. 1, shown is a block diagram of a cache memory in accordance with one embodiment of the present invention. As shown in FIG. 1, cache memory 10, which may be a sequential cache, is divided into a number of banks. Specifically as shown in FIG. 1, a plurality of banks $20_{1,1}$ to $20_{8,4}$ are present. While shown in the embodiment of FIG. 1 with 32 banks, it is to be understood that in other embodiments, a different number of banks may be present.

In various embodiments, cache memory 10 may be an N-way set associative cache. For example, cache memory 10 may have 256 sets and 8 ways and a total of 556 bits per entry. The total bits are divided into 4 chunks vertically and are segmented into 8 ways horizontally, resulting in the 32 banks. Each bank $20_{x,y}$ may include part (e.g., 139 bits) of an entry of every set of cache memory 10 for a single way. Of course, other implementations and divisions of a cache memory are possible.

In different embodiments, only the bank of interest may be powered on/off, thus saving significant power. While it is generally not possible to turn on/off an entire bank because way information is not available earlier in time, in various embodiments a bank may be completely be turned off using the sequential nature of a sequential cache.

Additionally shown in FIG. 1 is a way predictor 30 that may be used to predict a way of cache memory 10 to be accessed. Way predictor 30 may receive a tag address or a portion thereof and based on the address, predict one or more ways to be next accessed. Way predictor 30 may be implemented in a cache controller associated with cache memory 10, in one embodiment. As shown in FIG. 1, way predictor 30 may first determine that way zero is to be accessed, then way seven is to be accessed, as represented by the upward arrows from way predictor 30.

While not shown in FIG. 1, it is to be understood that each bank $20_{x,y}$ of cache memory 10 may include additional circuitry, including decoder circuitry, sense circuitry, and other control circuitry. The decoder circuitry may be used to decode address information to determine a selected set of a given bank, while sense circuitry may be used to sense the data of the selected set. The control circuitry may be used to enable write and read processes within the bank.

Figure 2:
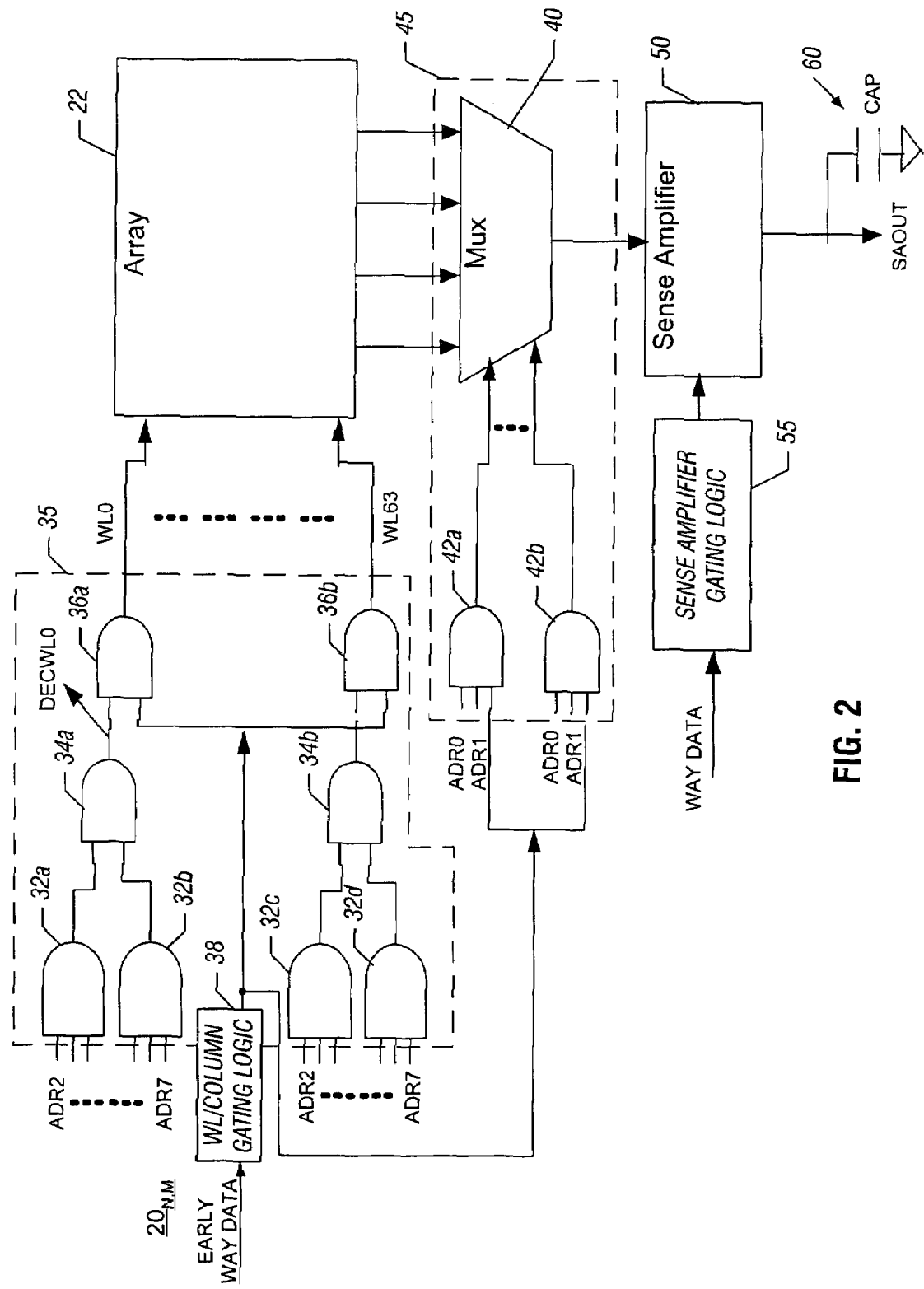
FIG. 2 is a block diagram of a single bank of a cache memory in accordance with one embodiment of the present invention.

Referring now to FIG. 2, shown is a block diagram of a single bank $20_{N,M}$ of cache memory 10 (of FIG. 1) in accordance with one embodiment of the present invention. As shown in FIG. 2, bank $20_{N,M}$ includes a data array 22 to store data. In the embodiment of FIG. 2, data array 22 may include 64 wordlines (WL0-63), arranged in four columns. Accordingly, data array 22 includes data entries corresponding to the 256 sets of cache memory 10. However, in other embodiments a different number of data entries and sets may be present.

A desired set within data array 22 may be accessed using wordline (WL) decoder or selector 35, while the column may be selected using column decoder or selector (CS) 45. As shown in FIG. 2, wordline decoder 35 includes various logic gates. Specifically, wordline decoder 35 includes a first set of AND gates 32a-32d coupled to receive address inputs. Specifically, more significant bits from a set address may be coupled to AND gates 32a and 32b and also to AND gates 32c and 32d. In the embodiment of FIG. 2, these bits may correspond to set address bits ADR2-7. In turn, the first set of AND gates 32a-d may be coupled to a second set of AND gates 34a and 34b. The outputs of AND gates 34a and 34b may be respectively coupled to a third set of AND gates 36a and 36b, which are also coupled to receive a wordline enable signal from a wordline/column gating logic 38.

Logic 38 is coupled to receive early way data. Logic 38 may be used to clock gate WL decoder 35 and CS 45 (i.e., disable them) unless the early way data indicates that data array 22 includes the next accessed data. This early way data may be obtained from a status array associated with the cache memory. As discussed above, early way data is stored in connection with each data entry (i.e., a traceline). The early way data corresponds to the next way for the next traceline. Based on the input address and the output of logic 38, a desired one of wordlines 0-63 may be selected.

Column selector 45 may be coupled to receive the least significant bits of a set address. Specifically, AND gates 42a and 42b of column selector 45 may be coupled to receive set address bits ADR 0 and ADR 1, along with the output of logic 38. The outputs of AND gates 42a and 42b in turn are coupled to a multiplexer 40. Based on the outputs of AND gates 42a and 42b, multiplexer 40 may select one of the four columns of data array 22.

Accordingly, wordline decoder 35 and column selector 45 may be used to select a given set within data array 22. The resulting entry is then provided to a sense amplifier (SA) 50, to sense the data stored in the set, provided as output data, SAOUT. A sense amplifier gating logic 55 is coupled to enable sense amplifier 50. Logic 55 receives incoming way data from a way predictor (e.g., way predictor 30 of FIG. 1). As shown, a capacitor 60 is coupled between the output of sense amplifier 50 and ground.

Thus in operation, the ADR2-ADR7 set address bits are decoded to select one of 64 wordlines (WL 0-63), and the remaining 2 address bits (ADR0 and 1) are decoded to choose one of the four column selects to provide to multiplexer 40. The 64 wordlines along with 4:1 column multiplexing constitute the 256 sets of data array 22. Sense amplifier 50 may be triggered using a sense amplifier enable signal from sense amplifier gating logic 55.

In various embodiments, power consumed by a cache memory may be reduced in three different ways using clock gating. First, wordline decoders may be clock gated. That is, logic 38 may be used to clock gate the wordline enable signal. By gating WL decoders, the corresponding CS's and SA's may be gated without creating a speed path. In such manner, only the wordline decoder, column selector, and sense amplifier of a selected bank will turn on, and switching capacitance will be minimal. In other embodiments, a group of banks may be turned on. For example, in the embodiment of FIG. 1, the four banks of a given way may be powered on when that way is selected. All other banks may be powered off.

A second manner of power savings may be to clock gate column selectors. Such clock gating may be effected using logic common with gating logic for a corresponding wordline decoder, or there may be dedicated gating logic to clock gate the column selectors. However, power reduction will not be as significant as with wordline gating, as wordline decoders for all ways will still be on.

A third manner of power savings may be to clock gate sense amplifiers. This manner of gating saves the least amount of power of the three different ways, as both wordline decoders and column selectors turn on for all ways and only the sense amplifier is turned off for non-selected ways.

In various embodiments, during a head access, the output of way predictor 30 may be used to gate only the SA of non-selected ways. That is, during a head access, an entry of a bank is read out using the way provided by way predictor 30, and the SA's of other banks are gated to avoid any speed paths. However, during body accesses, instead of using the way predictor output, the next way (i.e., early way) information stored in connection with the currently accessed entry may be used, and WL decoders, CS's, and SA's may be gated for all but the selected bank (or group of banks, such as banks $20_{1,1}$ to $20_{1,4}$ in the embodiment of FIG. 1).

During the same read cycle of the head access, the next way information (e.g., for a body0) is also read. This value corresponds to the way for the next access. Hence, the way information for a body is available a cycle earlier (early way information) and can be used to shut down the WL decoders and CS's in addition to the SA's of all non-selected banks for the subsequent access, thus saving significant power. Such early access to way information may be continuously leveraged to disable all control circuitry for unselected banks. In the event of a speed path or timing criticality, only a subset of the banks (or chunks) may be powered down.

As discussed above, another characteristic of sequential caches is that tag fields may be read out only during head accesses and not during body accesses. Referring to Table 1, shown are the tag array fields of a typical trace: all the entries are exactly the same.

TABLE 1

| Trace Portion | Tag Field |
|---|---|
| Head | H100000 |
| Body | H100000 |
| Body | H100000 |
| Tail | H100000 |

Therefore, tag matching is not needed for body accesses in accordance with an embodiment of the present invention. Thus a tag array of the cache memory may be powered down during body accesses and powered only during head accesses. To take full advantage of this characteristic of a sequential cache, the tag array may only include tag fields without other miscellaneous fields.

Also as discussed above, cache memory 10 of FIG. 1 has 256 sets that are segmented into 64 wordlines and 4 columns. A typical 8-bit set address sequence for a sequential cache is shown in Table 2.

TABLE 2

| Set Address |
|---|
| 00000000 |
| 00000001 |
| 00000010 |
| 00000011 |

As shown in Table 2, only the two least significant bits of the set address change within a trace length of four. Given that the average length of a trace is four, if the least two significant bits feed into the CS's, then corresponding WL decoders do not have to switch during trace accesses. Furthermore, the logic within the WL decoders that generates the WLs signals does not toggle. Thus, to maximize power savings, each bank of a cache memory may follow the addressing scheme shown in FIG. 2, in which the least significant bits of a set address (e.g., ADR0-2) are input into column selectors and the remaining bits (e.g., ADR2-7) are used for wordline generation. As shown in FIG. 2, using the addresses of Table 2 wordline decoder 35 does not switch (for any of the banks) and only column selectors 45 switch.

Figure 3:
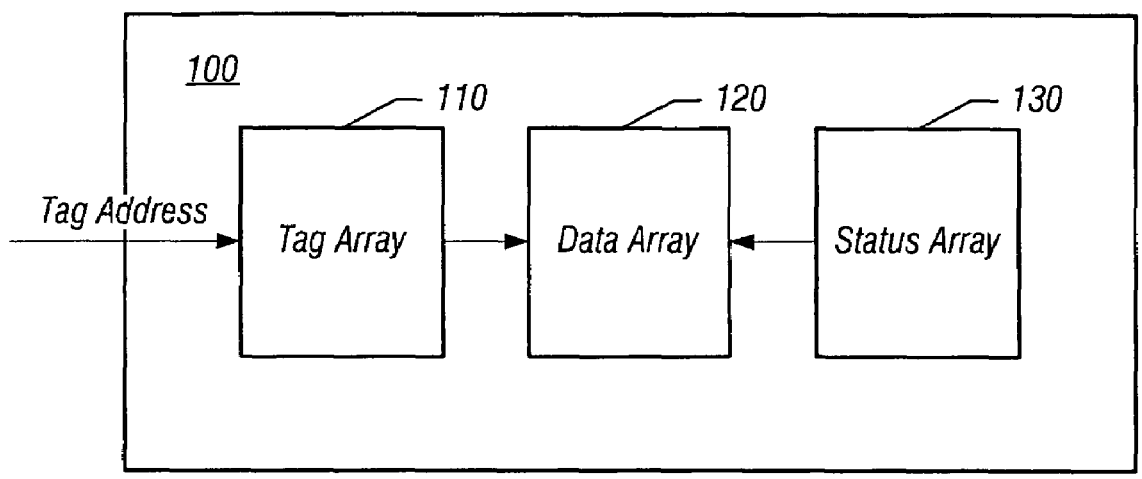
FIG. 3 is a block diagram of a cache memory in accordance with another embodiment of the present invention.

Referring now to FIG. 3, shown is a block diagram of a cache memory in accordance with one embodiment of the present invention. As shown in FIG. 3, cache memory 100 includes a tag array 110, a data array 120, and a status array 130. Of course, additional circuitry may be within cache memory 100. Tag array 110 includes corresponding sets to data array 120, and may be used to store tag entries. Tag array 110 may receive a tag address and compare it to tag entries therein. A tag match indicates a way in which data is stored. Accordingly, the way information is provided to data array 120.

However, because it can be time consuming to access tag array 110 and determine a match, in various embodiments early way information may be stored in status array 130. Accordingly, the early way information from status array 130 may be provided to select a given bank or set of banks within data array 120. For example, early way information may be used to select the four banks corresponding to a single way, as shown in FIG. 1. That is, early way information from status array 130 may be used to select banks $20_{1,1}$ to $20_{1,4}$ of FIG. 1 corresponding to way zero, for example.

Status array 130 may be arranged to include various information, such as metadata, for use in accessing associated data within data array 120. For example, in one embodiment, status array 130 may include several way fields, namely a next (i.e., early) way field and a previous way field, which indicates the way of the previous entry of a trace. In such manner, the way information within status array 130 acts as a linked list to link sequential data entries both forwards and backwards.

Still further, status array 130 may include additional fields, including a head field and a tail field. The head field may be used to indicate that the corresponding data entry is a head portion of a trace. In one embodiment, the head field may be a single bit, which when set indicates that the corresponding data entry is a head portion. Similarly, the tail field may be a bit to represent whether a corresponding data entry is a tail portion of a trace. Of course, in other embodiments, additional fields may be present within status array 130.

Figure 4:
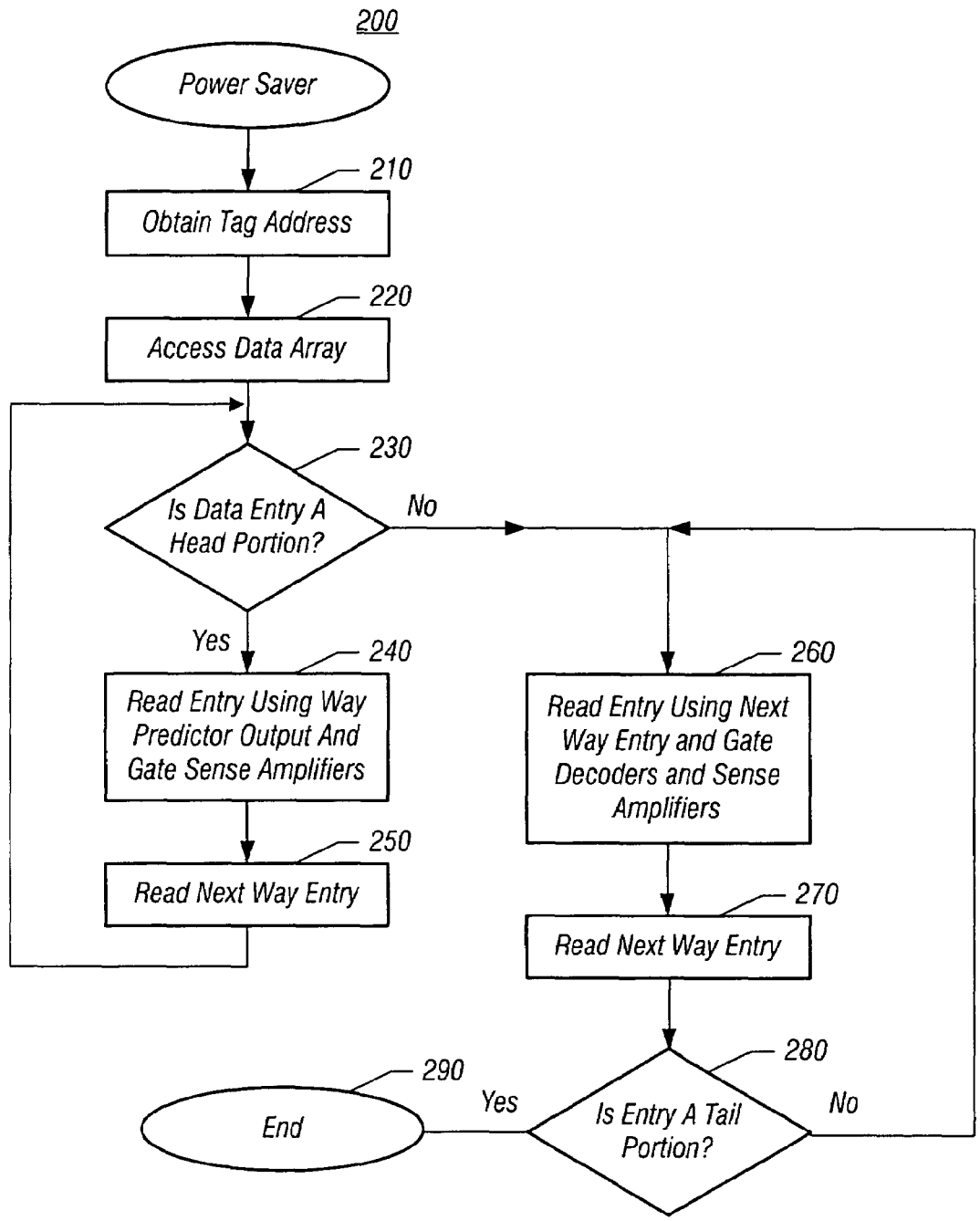
FIG. 4 is a flow diagram of a method in accordance with one embodiment of the present invention.

Referring now to FIG. 4, shown is a flow diagram of a method in accordance with one embodiment of the present invention. As shown in FIG. 4, a power saving method 200 may be used to reduce power consumption in a cache memory. The general process to reduce power consumption is to enable only banks and circuitry within the cache memory that pertain to an address to be accessed. In an example of a trace cache, only banks and circuitry associated with each part of a traceline may be sequentially enabled to enable fast access to stored traces in a stream mode while reducing power consumption. Referring to FIG. 4, method 200 begins by obtaining a tag address (block 210). The tag address may be used to access a data array (block 220). For example, the tag address may be input into a tag array which is searched to determine whether a hit occurs. If so, the hit data entry corresponds to the way (i.e., bank) to be selected. Accordingly, the data array of the bank is accessed and a set address is decoded to determine the selected set of the way.

Next it is determined whether a selected data entry is a head portion (diamond 230). As discussed above, such a determination may be made by reading a corresponding entry (e.g., a head field) of a status array. Such a head portion may correspond to a first traceline having a first pop of a trace. If the entry is a head portion, the entry of the selected bank is read using the way predictor output. Furthermore, the sense amplifiers for unselected ways are gated off (block 240). During the same cycle, a next way entry may be read (block 250). For example, next (i.e., early) way information may be stored in the status array in an entry corresponding to the data entry read at block 240.

In a second cycle, control returns to diamond 230, where an entry may be accessed based on the early way information obtained in block 250. At diamond 230, it may be confirmed that the entry is not a head portion. If not, a next traceline may be read out using the early way information (block 260). Furthermore, decoders (i.e., wordline decoders and column selectors) and sense amplifiers of unselected banks may be gated off (also block 260). In such manner, significant power savings may be realized. Note that if in diamond 230 is it determined that the accessed entry is a head portion, control proceeds to block 240, discussed above.

During the second cycle, a next way entry is read from the status array (block 270). Next it may be determined whether the entry read at block 260 is a tail portion (diamond 280). For example, an entry in the status array corresponding to the data entry may include a tail indicator to indicate when a tail of a trace is reached. If the entry is determined to be a tail portion at diamond 280, method 200 ends (oval 290). Alternately, control returns to block 260 to further read out the trace. While discussed with a specific sequence of actions in FIG. 4, it is to be understood that the scope of the present invention is not so limited and different sequences may be effected. For example, a determination of whether an entry is a tail portion may be made before reading a next way entry.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Figure 5:
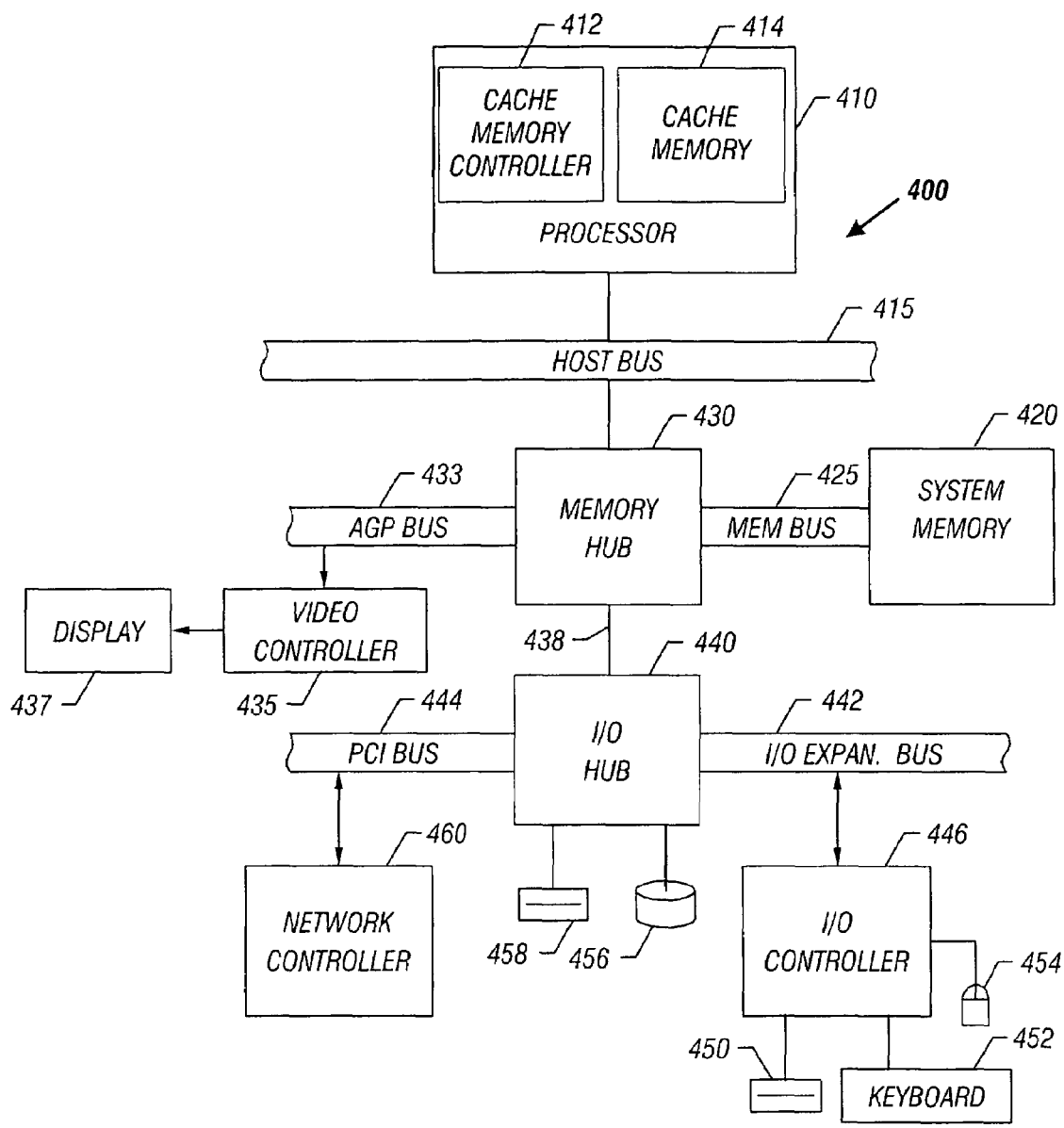
FIG. 5 is a block diagram of a computer system with which embodiments of the invention may be used.

Example embodiments may be implemented in software for execution by a suitable computer system configured with a suitable combination of hardware devices. FIG. 5 is a block diagram of a computer system 400 with which embodiments of the invention may be used. As used herein, the term "computer system" may refer to any type of processor-based system, such as a notebook computer, a server computer, a laptop computer, or the like.

Now referring to FIG. 5, in one embodiment, computer system 400 includes a processor 410, which may include a general-purpose or special-purpose processor such as a microprocessor, microcontroller, a programmable gate array (PGA), and the like. Processor 410 may include a cache memory controller 412 and a cache memory 414 in accordance with an embodiment of the present invention. Processor 410 may be coupled over a host bus 415 to a memory hub 430 in one embodiment, which may be coupled to a system memory 420 (e.g., a dynamic RAM) via a memory bus 425. Memory hub 430 may also be coupled over an Advanced Graphics Port (AGP) bus 433 to a video controller 435, which may be coupled to a display 437. AGP bus 433 may conform to the Accelerated Graphics Port Interface Specification, Revision 2.0, published May 4, 1998, by Intel Corporation, Santa Clara, Calif.

Memory hub 430 may also be coupled (via a hub link 438) to an input/output (I/O) hub 440 that is coupled to an input/output (I/O) expansion bus 442 and a Peripheral Component Interconnect (PCI) bus 444, as defined by the PCI Local Bus Specification, Production Version, Revision 2.1 dated June 1995. I/O expansion bus 442 may be coupled to an I/O controller 446 that controls access to one or more I/O devices. As shown in FIG. 5, these devices may include in one embodiment storage devices, such as a floppy disk drive 450 and input devices, such as a keyboard 452 and a mouse 454. I/O hub 440 may also be coupled to, for example, a hard disk drive 456 and a compact disc (CD) drive 458, as shown in FIG. 5. It is to be understood that other storage media may also be included in the system.

PCI bus 444 may also be coupled to various components including, for example, a network controller 460 that is coupled to a network port (not shown). Additional devices may be coupled to the I/O expansion bus 442 and the PCI bus 444, such as an input/output control circuit coupled to a parallel port, serial port, a non-volatile memory, and the like.

Although the description makes reference to specific components of system 400, it is contemplated that numerous modifications and variations of the described and illustrated embodiments may be possible. More so, while FIG. 5 shows a block diagram of a system such as a personal computer, it is to be understood that embodiments of the present invention may be implemented in a wireless device such as a cellular phone, personal digital assistant (PDA) or the like. Further, in other embodiments instead of a shared bus system, a point-to-point bus system, such as a common system interface (CSI) architecture may be implemented.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A cache memory comprising:
    data arrays each having N sets and a single way;
    wordline decoders each coupled to one of the data arrays;
    column selectors each coupled to one of the data arrays;
    selector disable circuits each coupled to one of the wordline decoders and one of the column selectors to disable the corresponding wordline decoder and column selector during a second cycle of a read operation based on early way information stored in a status array accessed during a first cycle of the read operation, the status array separate from a tag array and the data arrays, wherein each entry of the tag array is to store only a tag field;
    sense amplifiers each coupled to one of the data arrays; and
    sense amplifier gating circuits each coupled to one of the sense amplifiers to disable the corresponding sense amplifier during the first cycle based on way information from a way predictor.

2. The cache memory of claim 1, wherein the tag array is coupled to address a selected set of the cache memory.

3. The cache memory of claim 2, wherein the tag array to be disabled while a trace is read from the cache memory.

4. The cache memory of claim 1, wherein the early way information corresponds to a next way to be accessed during a trace read.

5. The cache memory of claim 1, wherein the cache memory comprises a sequential cache.

6. The cache memory of claim 1, wherein each of the column selectors is coupled to an output of one of the data arrays and to receive least significant bits of a set address and each of the wordline decoders is coupled to receive most significant bits of the set address.

7. The cache memory of claim 6, wherein the wordline decoder of a selected data array is to not switch during a read operation of a traceline as a result of receipt of the most significant bits of the set address.

8. A system comprising:
    a dynamic random access memory to store information; and
    a cache memory coupled to the dynamic random access memory comprising:
        a plurality of banks, each bank having:
            a data array;
            a decoder coupled to the data array to select a set of the data array, the decoder to be enabled only if the data array is selected for access, the decoder comprising a wordline decoder having a first set of logic gates to receive a most significant portion of a set address, a second set of logic gates coupled to an output of the first set of logic gates, and a third set of logic gates coupled to an output of the second set of logic gates and an output of gating logic, and a column decoder to receive a least significant portion of the set address and the output of the gating logic;
            a sense amplifier coupled to the data array to read data output from the data array;

a status array associated with the plurality of banks, the status array to store early way information, wherein the early way information corresponds to a way of a next set to be accessed and the early way information is to be used to gate the decoder if the data array is not selected for access; and a tag array associated wit the plurality of banks and separate from the status array and the data array, each entry of the tag array to store a tag field, wherein the tag array is to be powered down during read access to a trace body.

9. The system of claim 8, wherein the plurality of banks are to be powered off when not selected for access.

10. The system of claim 8. wherein the cache memory comprises a sequential cache.

11. The system of claim 8, wherein the gating logic is coupled to receive the early way information.

12. The system of claim 5, wherein the gating logic is to clock gate the decoder if the early way information obtained from the status array indicates tat a next access is not to the data array.

13. The system of claim 11, further comprising second gating logic to receive way prediction information and to gate the sense amplifier during a read access to a trace head in a different bank.

14. The system of claim 11, wherein the wordline decoder of a selected data array is to not switch during a read operation of a traceline as a result of receipt of the most significant portion of the set address.

* * * * *